US010095469B2

United States Patent
Reimann et al.

(10) Patent No.: US 10,095,469 B2
(45) Date of Patent: Oct. 9, 2018

(54) PLAYBACK BASED ON IDENTIFICATION

(71) Applicant: SONOS, INC., Santa Barbara, CA (US)

(72) Inventors: Robert Reimann, Cambridge, MA (US); David Taylor, Santa Barbara, CA (US); Abhishek Kumar, Hayward, CA (US)

(73) Assignee: SONOS, INC., Santa Barbara, CA (US)

( * ) Notice: Subject to any disclaimer, the term of this patent is extended or adjusted under 35 U.S.C. 154(b) by 111 days.

(21) Appl. No.: 15/205,753

(22) Filed: Jul. 8, 2016

(65) Prior Publication Data

US 2016/0357512 A1 Dec. 8, 2016

Related U.S. Application Data

(63) Continuation of application No. 13/338,724, filed on Dec. 28, 2011, now Pat. No. 9,665,339.

(51) Int. Cl.
| | |
|---|---|
| *G06F 17/00* | (2006.01) |
| *G06F 3/16* | (2006.01) |
| *G06F 3/0484* | (2013.01) |
| *G06F 17/30* | (2006.01) |

(52) U.S. Cl.
CPC ............ *G06F 3/165* (2013.01); *G06F 3/0484* (2013.01); *G06F 17/30761* (2013.01); *G06F 17/3074* (2013.01); *G06F 17/30743* (2013.01)

(58) Field of Classification Search
CPC ...... G06F 17/00; G06F 17/30743; G06F 3/16; G11B 20/10527; G11B 27/105; G11B 2020/10546
USPC ............................. 700/94; 84/601, 604, 609
See application file for complete search history.

(56) References Cited

U.S. PATENT DOCUMENTS

| | | |
|---|---|---|
| 5,406,634 A | 4/1995 | Anderson et al. |
| 5,440,644 A | 8/1995 | Farinelli et al. |
| 5,761,320 A | 6/1998 | Farinelli et al. |
| 5,856,827 A | 1/1999 | Sudo |
| 5,923,902 A | 7/1999 | Inagaki |
| 6,002,862 A | 12/1999 | Takaike |
| 6,029,195 A | 2/2000 | Herz |
| 6,032,202 A | 2/2000 | Lea et al. |
| 6,108,686 A | 8/2000 | Williams, Jr. |
| 6,181,316 B1 | 1/2001 | Little et al. |
| 6,255,961 B1 | 7/2001 | Van Ryzin et al. |
| 6,256,554 B1 | 7/2001 | Dilorenzo |

(Continued)

FOREIGN PATENT DOCUMENTS

| | | |
|---|---|---|
| EP | 1389853 A1 | 2/2004 |
| KR | 100890993 | 3/2009 |

(Continued)

OTHER PUBLICATIONS

First Action Interview Office Action dated Nov. 17, 2016, issued in connection with U.S. Appl. No. 14/300,564, filed Jun. 10, 2014, 3 pages.

(Continued)

*Primary Examiner* — Xu Mei

(57) ABSTRACT

At least one first user and at least one second user is identified. At least one audio track is selected based on (a) the identification of the at least one first user, (b) the identification of the at least one second user, and (c) a time of day. A playback device begins playback of the selected at least one audio track.

20 Claims, 7 Drawing Sheets

(56) References Cited

U.S. PATENT DOCUMENTS

| | | |
|---|---|---|
| 6,349,339 B1 | 2/2002 | Williams |
| 6,404,811 B1 | 6/2002 | Cvetko et al. |
| 6,469,633 B1 | 10/2002 | Wachter |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,985,694 B1 | 1/2006 | De Bonet et al. |
| 7,017,118 B1 | 3/2006 | Carroll |
| 7,020,048 B2 | 3/2006 | McComas |
| 7,113,833 B1 | 9/2006 | Brown et al. |
| 7,117,451 B2 | 10/2006 | Sielken |
| 7,124,125 B2 | 10/2006 | Cook et al. |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,236,739 B2 | 6/2007 | Chang |
| 7,236,773 B2 | 6/2007 | Thomas |
| 7,295,548 B2 | 11/2007 | Blank et al. |
| 7,312,785 B2 | 12/2007 | Tsuk et al. |
| 7,358,960 B2 | 4/2008 | Mak |
| 7,391,791 B2 | 6/2008 | Balassanian et al. |
| 7,483,538 B2 | 1/2009 | McCarty et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,580,325 B2 | 8/2009 | Welk et al. |
| 7,599,685 B2 | 10/2009 | Goldberg et al. |
| 7,630,501 B2 | 12/2009 | Blank et al. |
| 7,643,894 B2 | 1/2010 | Braithwaite et al. |
| 7,657,224 B2 | 2/2010 | Goldberg et al. |
| 7,657,910 B1 | 2/2010 | McAulay et al. |
| 7,725,533 B2 | 5/2010 | Szeto et al. |
| 7,725,551 B2 | 5/2010 | Szeto et al. |
| 7,739,271 B2 | 6/2010 | Cook et al. |
| 7,739,596 B2 | 6/2010 | Clarke-Martin et al. |
| 7,742,740 B2 | 6/2010 | Goldberg et al. |
| 7,774,078 B2 | 8/2010 | Booth et al. |
| 7,805,682 B1 | 9/2010 | Lambourne |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,912,565 B2 | 3/2011 | Tazine et al. |
| 7,916,877 B2 | 3/2011 | Goldberg et al. |
| 7,917,082 B2 | 3/2011 | Goldberg et al. |
| 7,962,482 B2 | 6/2011 | Handman et al. |
| 7,987,294 B2 | 7/2011 | Bryce et al. |
| 7,987,426 B2 | 7/2011 | Cotter et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,074,253 B1 | 12/2011 | Nathan |
| 8,103,009 B2 | 1/2012 | McCarty et al. |
| 8,131,390 B2 | 3/2012 | Braithwaite et al. |
| 8,135,669 B2 | 3/2012 | Olstad et al. |
| 8,214,873 B2 | 7/2012 | Weel |
| 8,230,099 B2 | 7/2012 | Weel |
| 8,234,395 B2 | 7/2012 | Millington et al. |
| 8,392,468 B2 | 3/2013 | Sato |
| 8,483,853 B1 | 7/2013 | Lambourne |
| 8,762,843 B2 | 6/2014 | Morse et al. |
| 8,910,265 B2 | 12/2014 | Lang et al. |
| 8,942,252 B2 | 1/2015 | Balassanian et al. |
| 9,137,564 B2 | 9/2015 | Reimann |
| 9,232,277 B2 | 1/2016 | Vega et al. |
| 9,245,020 B2 | 1/2016 | Joffray et al. |
| 9,247,363 B2 | 1/2016 | Triplett et al. |
| 9,286,384 B2 | 3/2016 | Kuper et al. |
| 9,374,607 B2 | 6/2016 | Bates et al. |
| 9,478,247 B2 | 10/2016 | Chen |
| 9,547,647 B2 | 1/2017 | Badaskar et al. |
| 9,665,339 B2 * | 5/2017 | Reimann ........... G06F 17/30761 |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0056117 A1 | 5/2002 | Hasegawa et al. |
| 2002/0124097 A1 | 9/2002 | Isely et al. |
| 2002/0163361 A1 | 11/2002 | Parkin |
| 2002/0165921 A1 | 11/2002 | Sapieyevski |
| 2002/0178191 A1 | 11/2002 | Sielken |
| 2003/0023741 A1 | 1/2003 | Tomassetti et al. |
| 2003/0073432 A1 | 4/2003 | Meade |
| 2003/0157951 A1 | 8/2003 | Hasty |
| 2003/0210796 A1 | 11/2003 | McCarty et al. |
| 2003/0221541 A1 | 12/2003 | Platt |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0088328 A1 | 5/2004 | Cook et al. |
| 2004/0215611 A1 | 10/2004 | Jawa et al. |
| 2004/0261040 A1 | 12/2004 | Radcliffe et al. |
| 2005/0108320 A1 | 5/2005 | Lord et al. |
| 2005/0166157 A1 | 7/2005 | Ollis et al. |
| 2006/0107237 A1 | 5/2006 | Kim |
| 2006/0168340 A1 | 7/2006 | Heller et al. |
| 2006/0253436 A1 | 11/2006 | Cook et al. |
| 2006/0253782 A1 | 11/2006 | Stark et al. |
| 2007/0025194 A1 | 2/2007 | Morse et al. |
| 2007/0038999 A1 | 2/2007 | Millington et al. |
| 2007/0088747 A1 | 4/2007 | Cheng et al. |
| 2007/0142944 A1 | 6/2007 | Goldberg et al. |
| 2007/0214106 A1 | 9/2007 | Johnston et al. |
| 2007/0239562 A1 | 10/2007 | Lawson |
| 2007/0266843 A1 | 11/2007 | Schneider |
| 2007/0288470 A1 | 12/2007 | Kauniskangas et al. |
| 2007/0294131 A1 | 12/2007 | Roman et al. |
| 2008/0005690 A1 | 1/2008 | Van Vugt |
| 2008/0016465 A1 | 1/2008 | Foxenland |
| 2008/0052371 A1 | 2/2008 | Partovi et al. |
| 2008/0066102 A1 | 3/2008 | Abraham et al. |
| 2008/0086750 A1 | 4/2008 | Yasrebi et al. |
| 2008/0131085 A1 | 6/2008 | Ikeda et al. |
| 2008/0155588 A1 | 6/2008 | Roberts et al. |
| 2008/0250328 A1 | 10/2008 | Konttinen |
| 2009/0031254 A1 | 1/2009 | Herpel et al. |
| 2009/0063975 A1 | 3/2009 | Bull et al. |
| 2009/0106297 A1 | 4/2009 | Wright et al. |
| 2009/0157680 A1 | 6/2009 | Crossley et al. |
| 2009/0171715 A1 | 7/2009 | Conley et al. |
| 2009/0228919 A1 | 9/2009 | Zott et al. |
| 2009/0234878 A1 | 9/2009 | Herz et al. |
| 2009/0249222 A1 | 10/2009 | Schmidt et al. |
| 2009/0292819 A1 | 11/2009 | Kandekar et al. |
| 2009/0307062 A1 | 12/2009 | Lutnick et al. |
| 2010/0017366 A1 | 1/2010 | Robertson et al. |
| 2010/0082641 A1 | 4/2010 | Rinckes et al. |
| 2010/0205222 A1 | 8/2010 | Gajdos et al. |
| 2010/0235741 A1 | 9/2010 | Newman et al. |
| 2010/0262909 A1 | 10/2010 | Hsieh |
| 2010/0268360 A1 | 10/2010 | Ingrassia et al. |
| 2010/0281369 A1 | 11/2010 | Bell et al. |
| 2010/0293187 A1 | 11/2010 | Biehn et al. |
| 2011/0004330 A1 | 1/2011 | Rothkopf et al. |
| 2011/0106954 A1 | 5/2011 | Chatterjee et al. |
| 2011/0131272 A1 | 6/2011 | Littlejohn et al. |
| 2011/0154198 A1 | 6/2011 | Bachman et al. |
| 2011/0161348 A1 | 6/2011 | Oron |
| 2012/0023099 A1 | 1/2012 | Crossley et al. |
| 2012/0054233 A1 | 3/2012 | Svendsen et al. |
| 2012/0059914 A1 | 3/2012 | Banger et al. |
| 2012/0071996 A1 | 3/2012 | Svendsen |
| 2012/0089910 A1 | 4/2012 | Cassidy |
| 2012/0117017 A1 | 5/2012 | Phillips et al. |

(56) References Cited

U.S. PATENT DOCUMENTS

| | | | |
|---|---|---|---|
| 2012/0117586 | A1 | 5/2012 | McCoy et al. |
| 2012/0150614 | A1 | 6/2012 | Dion et al. |
| 2012/0254256 | A1 | 10/2012 | Martin |
| 2012/0254363 | A1 | 10/2012 | Martin et al. |
| 2013/0148720 | A1 | 6/2013 | Rabii |
| 2013/0173034 | A1 | 7/2013 | Reimann et al. |
| 2013/0219273 | A1 | 8/2013 | Coburn |
| 2013/0254207 | A1 | 9/2013 | Coburn, IV et al. |
| 2013/0343567 | A1 | 12/2013 | Triplett et al. |
| 2013/0347018 | A1 | 12/2013 | Limp et al. |
| 2014/0005813 | A1 | 1/2014 | Reimann |
| 2014/0129015 | A1 | 5/2014 | Lindahl et al. |
| 2014/0149553 | A1 | 5/2014 | Bank et al. |
| 2014/0181107 | A1 | 6/2014 | Coburn et al. |
| 2014/0181199 | A1 | 6/2014 | Kumar et al. |
| 2014/0181654 | A1 | 6/2014 | Kumar et al. |
| 2014/0181655 | A1 | 6/2014 | Kumar et al. |
| 2014/0277639 | A1 | 9/2014 | Gomes-Casseres et al. |
| 2014/0368737 | A1 | 12/2014 | Hoffert et al. |
| 2015/0095170 | A1 | 4/2015 | Lang et al. |
| 2015/0095323 | A1 | 4/2015 | Bates |
| 2015/0253960 | A1 | 9/2015 | Lin et al. |
| 2015/0310009 | A1 | 10/2015 | Van Der Heide |
| 2015/0310023 | A1 | 10/2015 | Van Der Heide |
| 2015/0312299 | A1 | 10/2015 | Chen |

FOREIGN PATENT DOCUMENTS

| | | |
|---|---|---|
| WO | 200153994 | 7/2001 |
| WO | 2003093950 A2 | 11/2003 |
| WO | 2012030006 A1 | 3/2012 |

OTHER PUBLICATIONS

International Bureau, International Preliminary Report on Patentability dated Dec. 22, 2016, issued in connection with International Application No. PCT/US2015/032169, filed on May 22, 2015, 7 pages.
"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Advisory Action dated Sep. 16, 2015, issued in connection with U.S. Appl. No. 13/338,724, filed Dec. 28, 2011, 3 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Final Office Action dated Jul. 8, 2015, issued in connection with U.S. Appl. No. 13/338,724, filed Dec. 28, 2011, 15 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Nov. 21, 2014, issued in connection with U.S. Appl. No. 13/338,724, filed Dec. 28, 2011, 18 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
Buskirk; Eliot Van., "Music Needs 'Connective Tissue' and Facebook Wants to Build it", Evolver-1m, http://evolver.fm/2011/09/01/music-needs-connective-tissue-and-facebook-wants-to-build-iti, Sep. 1, 2011, 6 pages.
International Bureau, International Preliminary Report on Patentability dated Apr. 3, 2014, issued in aonnection with International Application No. PCT/US2012/056467, filed on Sep. 21, 2011, 11 pages.
International Searching Authority, International Search Report and Written Opinion dated Oct. 8, 2015, issued in connection with International Application No. PCT/US2015/032169, filed on May 22, 2015, 10 pages.
International Searhing Authority, International Search Report and Written Opinion dated Feb. 28, 2013, issued in connection with International Application No. PCT/US2012/056467, filed on Sep. 21, 2012, 12 pages.
Non-Final Office Action dated Oct. 6, 2016, issued in connection with U.S. Appl. No. 13/338,724, filed Dec. 28, 2011, 15 pages.
Office Communicaiton dated Nov. 8, 2016, issued in connection with U.S. Appl. No. 14/300,564, filed Jun. 10, 2014, 3 pages.
Preinterview First Office Action dated Nov. 1, 2016, issued in connection with U.S. Appl. No. 14/300,564, filed Jun. 10, 2014, 5 pages.
PRISMIQ, Inc., "PRISMIQ Media Player User Guide," 2003, 44 pages.
European Patent Office, European Search Report dated Oct. 5, 2017, issued in connection with EP Application No. 15806449.3, 10 pages.
Non-Final Office Action dated Nov. 1, 2017, issued in connection with U.S. Appl. No. 15/205,479, filed Jul. 8, 2016, 7 pages.
Non-Final Office Action dated Oct. 17, 2017, issued in connection with U.S. Appl. No. 15/613,762, filed Jun. 5, 2017, 13 pages.
Notice of Allowance dated Apr. 11, 2017, issued in connection with U.S. Appl. No. 13/338,724, filed Dec. 28, 2011, 8 pages.
Notice of Allowance dated Mar. 23, 2017, issued in connection with U.S. Appl. No. 14/300,564, filed Jun. 10, 2014, 14 pages.

\* cited by examiner

PLAYBACK BASED ON IDENTIFICATION

CROSS-REFERENCE TO RELATED APPLICATIONS

This application claims the benefit of priority under 35 USC § 120 as a continuation to U.S. patent application Ser. No. 13/338,724 filed on Dec. 28, 2011 and entitled "METHODS AND SYSTEMS TO SELECT AN AUDIO TRACK", the contents of which is herein incorporated by reference in its entirety.

FIELD OF THE DISCLOSURE

The disclosure is related to digital content and, more particularly, to methods and systems to select an audio track.

BACKGROUND

Technological advancements have increased the accessibility of audio tracks such as, for example, music content. For example, a user can access audio content over the Internet through an online store, an Internet radio station, an online music service, an online movie service, and the like, in addition to the more traditional avenues of accessing audio content. Commonly a user selects the music he or she wishes to hear, and new music is discovered through friends or other associates or via advertisements such as television advertisements.

BRIEF DESCRIPTION OF THE DRAWINGS

Features, aspects, and advantages of the presently disclosed technology are better understood with regard to the following description, appended claims, and accompanying drawings where:

Figure 1:
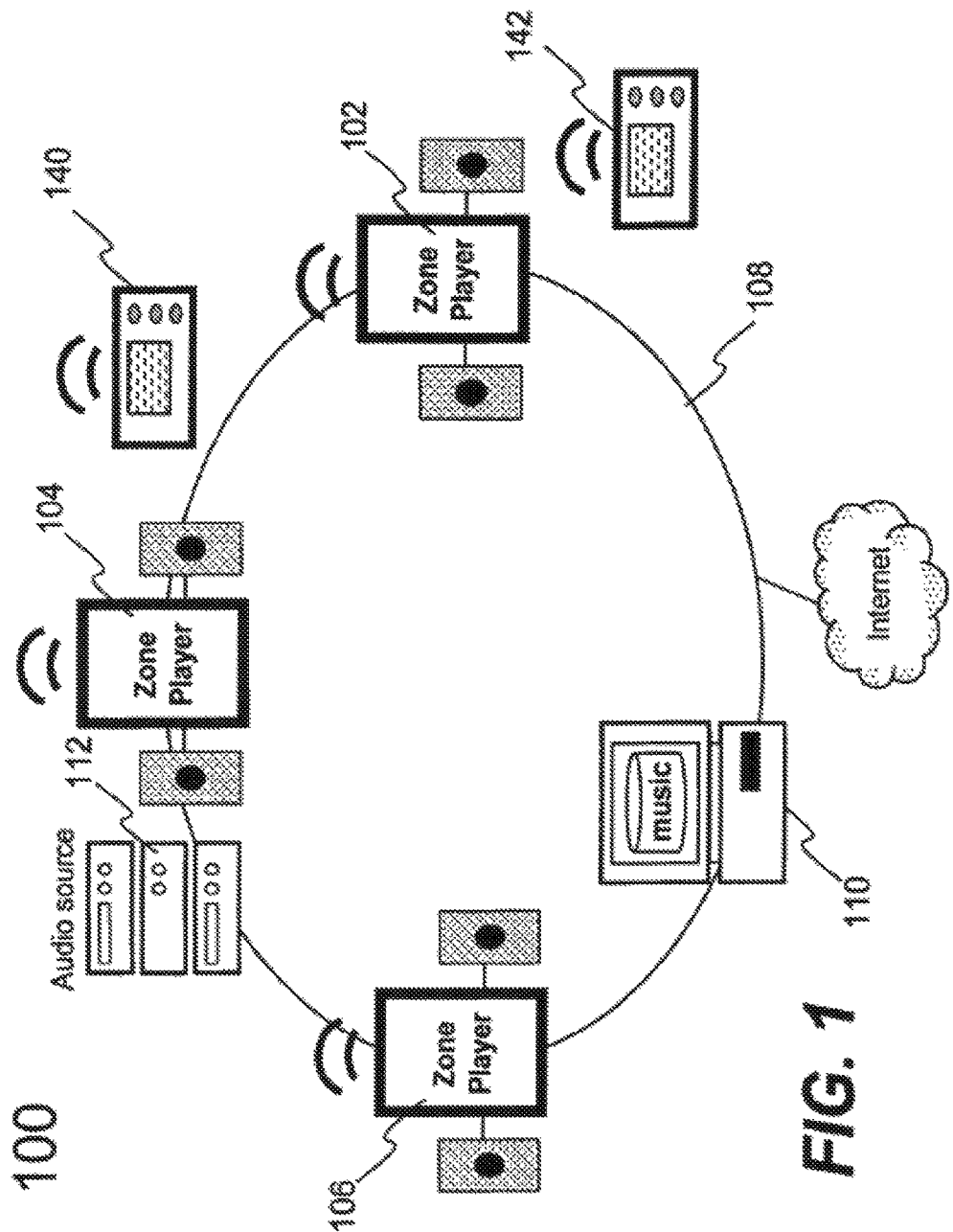
FIG. 1 illustrates an example system in which embodiments of the methods and apparatus disclosed herein may be implemented.

In addition, the drawings are for the purpose of illustrating example embodiments, but it is understood that the present disclosure is not limited to the arrangements and instrumentality shown in the drawings.

DETAILED DESCRIPTION

I. Overview

Certain embodiments disclosed herein enable the selection of particular audio sources or tracks such as, for example, specific songs, playlists, artists, albums and/or genres. Music listeners have a variety of listening habits that depend on many conditions (e.g., playback conditions) and music properties. A playback condition may be any condition, state, attribute, characteristic and/or other situation or metric related to the playing of an audio track. The playback conditions may include time related conditions, location related conditions, and/or listener or user related conditions. A music property may include a tempo, a rhythm, a genre, an artist and/or a tagging to any of the conditions disclosed herein.

A time related playback condition may include, for example, a time of day. For example, some music listeners prefer to listen to a talk show in the morning. Others prefer lower tempo or "chill out" music in the morning. Also, some music listeners prefer faster music with a more upbeat tempo in an afternoon or during, for example, a Friday evening. Example time playback conditions may include a specific hour, a morning, an afternoon, an evening, a night, a day of the week, a month, a year, a time of year, a holiday, an event, a birthday, a wedding anniversary, an anniversary of a world or historical event, a date related to a milestone, a date related to what tracks were played last year or at specific past events, and/or any other time related metric. These time related events are correlated to different music desires for different music listeners. Time related playback conditions also may include, for example, a frequency of a play of a particular audio track and/or a recentness of a particular play of a track.

A location related playback condition may include, for example, a geographic location, a particular zone in a house or other building, a zone group, a zone room, a particular zone player in a room, a particular room, an outdoor location, an indoor location, a presence of a vehicle and/or any other location. Music listeners may listen to different tracks of music in different locations. A music listener may want to hear a particular set of songs if located, for example, poolside and a different set of songs if located, for example, in a child's nursery.

The playback conditions may also be related to the user (e.g., the listener). The user related playback conditions could be who the user is, e.g., the user's identity, a demographic group and/or an interest. Different people prefer to listen to different types of music. In addition, generalizations may be made about the musical tastes of certain demographic groups. For example, baby boomers may prefer to listen to classic rock. Teenagers may prefer, for example, to listen to the Billboard Top 40.

In addition, the playback conditions may be related to social relationships between the user and other listeners. If the user has "friended" or otherwise subscribed to another user's music listening patterns, the user may receive recommendations (e.g., selected audio tracks) based on the user's friends' listening habits. Additionally, audio track selection(s) based on social network connections also may be correlated with temporal and/or other conditions. Furthermore, in some examples, audio track selection(s) based on social network connections may be presented to two or more users to enable the users to engage in co-listening of the selected audio track(s).

Other condition(s) may include weather-related conditions such as, for example, playing particular song(s) when it is sunny and/or other song(s) when it is rainy. Any condition(s) may be defined by the user of the example systems disclosed herein.

Typically when a user wants to hear one or more particular audio track(s) based on, for example, a time, location or user related playback condition, the user has to manually obtain and play a song that has properties that satisfies one or more of the condition(s). In some situations, the user may be unaware of suitable audio tracks with properties that meet the conditions because, for example, an audio track is newly released, the user has not been exposed to the track and/or the user otherwise does not remember or have knowledge of the track to be able to choose it for playback. In other examples, the user may be unaware of the conditions.

The examples disclosed herein enable automatic selection of audio tracks for presentation to a user based on playback conditions such as, for example, time, location, user characteristics and/or other conditions. The examples disclosed herein match one or more properties of one or more audio tracks with the playback conditions and selects those tracks with properties that satisfy the conditions for presentation to the user for playback. Thus, certain embodiments disclosed herein use time, location and/or other conditions to provide relevant music without the user doing anything other than listening to what they listen to, and the example system disclosed herein further associates the music with zone groups, rooms, zone players and time slots. Additional embodiments are described herein.

As used herein, "audio track" or "track" refers to an audio source, audio file, music, a song and/or any other sound-based file.

Moving on from the above illustration, an example embodiment of a method of selecting an audio track is disclosed herein. The example method includes that includes detecting a first playback condition and detecting a second playback condition. In addition, the example method includes comparing, using a processor, a first audio track property of a first audio track to the first playback condition and the second playback condition to determine if the first audio track property matches one or more of the first playback condition or the second playback condition. The example also includes comparing, with the processor, a second audio track property of the first audio track to the first playback condition and the second playback condition to determine if the second audio track property matches one or more of the first playback condition or the second playback condition. In addition, the example method includes selecting the first audio track for presentation to a user when the first playback condition matches one or more of the first audio track property or the second audio track property and the second playback condition matches one or more of the first audio track property or the second audio track property.

In some embodiments, the first condition is a time and the second condition is a location and the first property is a time and the second property is a location. In some examples, the time is one or more of an hour, a day, a portion of a day, a timeslot, a frequency of two or more prior playbacks and/or a recentness of a prior playback.

In some embodiments, the location is one or more of a geographic location, an outdoor location, a vehicle location, a room and/or a zone.

In some embodiments, the first condition and the first property are a characteristic of the user. In some embodiments, the characteristic of the user is one or more of an identity of the user, a demographic group and/or an interest. In some embodiments, the method includes identifying the user based on a profile associated with a playback device. In some embodiments, the method includes identifying the user based on an operation history of a playback device.

In some embodiments, the first condition and the first property are defined by the user.

In some embodiments, the first condition and the first property comprise one or more of a rhythm, a tempo and/or a genre.

In some embodiments, the method also includes presenting the audio track for playback to the user by one or more of playing the audio track, queuing the audio track for playback and/or presenting the user with a link to obtain the audio track.

The method also includes, in some examples, comparing, using the processor, a third audio track property of a second audio track to the first playback condition and the second playback condition to determine if the third audio track property matches one or more of the first playback condition or the second playback condition. In addition, the example method includes comparing, with the processor, a fourth audio track property of the second audio track to the first playback condition and the second playback condition to determine if the fourth audio track property matches one or more of the first playback condition or the second playback condition. In addition, the example method includes selecting the second audio track for presentation to a user when the first playback condition matches one or more of the third audio track property or the fourth audio track property and the second playback condition matches one or more of the third audio track property or the fourth audio track property.

Example systems to select an audio track also are disclosed. An embodiments of an example system includes a detector to detect a first playback condition and a second playback condition. The example system also includes a comparator to compare a first audio track property of a first audio track to the first playback condition and the second playback condition to determine if the first audio track property matches one or more of the first playback condition or the second playback condition, and to compare a second audio track property of the first audio track to the first playback condition and the second playback condition to determine if the second audio track property matches one or more of the first playback condition or the second playback condition. In addition, the example system includes a selector to select the first audio track for presentation to the user when the first playback condition matches one or more of the first audio track property or the second audio track property and the second playback condition matches one or more of the first audio track property or the second audio track property.

In some embodiments, the detector is to identify the user based on one or more of a profile associated with a playback device and/or an operation history of the playback device.

In some embodiments, the system includes a display to present the audio track for playback to the user by one or more of playing the audio track, queuing the audio track for playback and/or presenting the user with a link to obtain the audio track. In some embodiments, the display is a graphical user interface to visually present one or more of the audio track or other information to the user. In some embodiments, the display is integrated with a playback device such as, for example, with a controller of the playback device.

In some embodiments, the comparator is to compare a third audio track property of a second audio track to the first playback condition and the second playback condition to determine if the third audio track property matches one or more of the first playback condition or the second playback condition, and to compare a fourth audio track property of the second audio track to the first playback condition and the second playback condition to determine if the fourth audio track property matches one or more of the first playback condition or the second playback condition. In addition, in such embodiments, the selector is to select the second audio track for presentation to the user when the first playback condition matches one or more of the third audio track property or the fourth audio track property and the second playback condition matches one or more of the third audio track property or the fourth audio track property.

Example tangible machine readable media are disclosed herein. In some embodiments, an example machine readable medium has instructions stored therein, which when executed, cause the machine to at least detect a first playback condition and detect a second playback condition. The example medium also causes the machine to compare a first audio track property of a first audio track to the first playback condition and the second playback condition to determine if the first audio track property matches one or more of the first playback condition or the second playback condition, and compare a second audio track property of the first audio track to the first playback condition and the second playback condition to determine if the second audio track property matches one or more of the first playback condition or the second playback condition. In addition, the example medium causes the machine to select the first audio track for presentation to a user when the first playback condition matches one or more of the first audio track property or the second audio track property and the second playback condition matches one or more of the first audio track property or the second audio track property.

In some embodiments, the machine is further caused to identify an identity of the user based on one or more of a profile associated with a playback device and/or an operation history of the playback device, wherein the first condition and the first property are the identity of the user.

Although the following discloses example methods, apparatus, systems, and articles of manufacture including, among other components, firmware and/or software executed on hardware, it should be noted that such methods, apparatus, systems, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

When any of the appended claims are read to cover a purely software and/or firmware implementation, at least one of the elements in at least one example is hereby expressly defined to include a tangible medium such as a memory, DVD, CD, Blu-ray, etc., storing the software and/or firmware, as discussed in greater detail below.

These embodiments and many additional embodiments are described more below. Further, the detailed description is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure may be practiced without certain, specific details. In other instances, well known methods, procedures, components, and circuitry have not been described in detail to avoid unnecessarily obscuring aspects of the embodiments.

Reference herein to "embodiment" means that a particular feature, structure, or characteristic described in connection with the embodiment can be included in at least one example embodiment disclosed herein. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, may be combined with other embodiments.

II. Example Environment

Referring now to the drawings, in which like numerals may refer to like parts throughout the figures. FIG. 1 shows an example system 100 in which the example methods, apparatus and machine readable medium disclosed herein may be practiced. The system 100 may represent, but not be limited to, a part of a residential home, a business building or a complex with multiple zones. There are a number of multimedia players of which three examples 102, 104 and 106 are shown as audio devices. Each of the audio devices may be installed or provided in one particular area or zone and hence referred to as "a zone player" herein.

As used herein, unless explicitly stated otherwise, audio source(s) or audio track(s) are in digital format and can be transported or streamed over a data network. In the examples disclosed herein, the system 100 will be described as a home. Thus, the zone player 102 and 104 may be located in two bedrooms respectively while the zone player 106 may be installed in a living room. All of the zone players 102, 104 and 106 are coupled directly or indirectly to a data network 108. In addition, a computing device 110 is shown to be coupled on the network 108. In reality, any other devices such as a home gateway device, a storage device, or an MP3 player may be coupled to the network 108 as well.

Example zone players include a "Sonos® S5," "Sonos Play:5," "ZonePlayer 120," and "ZonePlayer 90," which are offered by Sonos, Inc. of Santa Barbara, Calif. A zone player may also be referred to herein as a playback device, and a zone player is not limited to the particular examples illustrated herein. For example, a zone player may include a wired or wireless headphone. In another example, a zone player might include a subwoofer. In an example, a zone player may include or interact with a docking station for an Apple iPod™ or similar device. In some embodiments, a zone player may relay one or more signals received from, for example, a first zone player to another playback device. In some embodiments, a zone player may receive a first signal and generate an output corresponding to the first signal and, simultaneously or separately, may receive a second signal and transmit or relay the second signal to another zone player(s), speaker(s), receiver(s), etc. Thus, an example zone player described herein can act as a playback device and, at the same time, operate as a hub in a network of zone players. In such instances, media content corresponding to the first signal may be different from the media content corresponding to the second signal.

The network 108 may be a wired network, a wireless network or a combination of both. In one example, all devices including the zone players 102, 104 and 106 are coupled to the network 108 by wireless means based on an industry standard such as IEEE 802.11. In yet another example, all devices including the zone players 102, 104 and 106 are part of a local area network that communicates with a wide area network (e.g., the Internet).

Many devices on the network 108 are configured to download and store audio sources. For example, the computing device 110 can download audio sources from the Internet and store the downloaded sources locally for sharing with other devices on the Internet or the network 108. The computing device 110 or any of the zone players 102, 104 and 106 can also be configured to receive streaming audio. Shown as a stereo system, the device 112 is configured to receive an analog audio source (e.g., from broadcasting) or retrieve a digital audio source (e.g., from a compact disk). The analog audio sources can be converted to digital audio sources. In some examples, the audio source may be shared among the devices on the network 108.

Two or more zone players may be grouped together to form a new zone group. Any combinations of zone players 102, 104 and 106 and an existing zone group may be grouped together. In one instance, a new zone group is formed by adding one zone player to another zone player or an existing zone group.

Figure 2A:
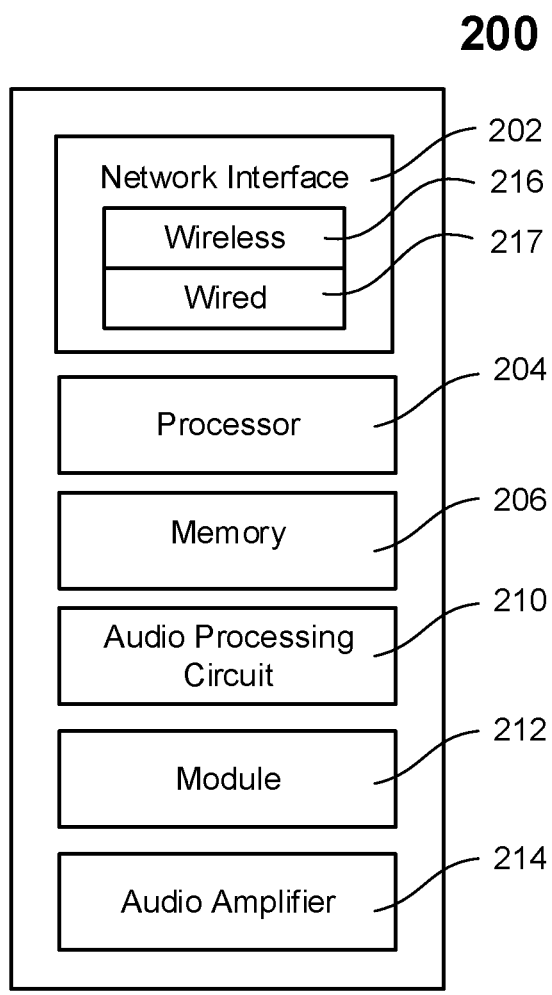
FIG. 2A illustrates an exemplary functional block diagram of an example player.

FIG. 2A is a functional block diagram of an example zone player 200. The example zone player 200 includes a network interface 202, a processor 204, a memory 206, an audio processing circuit 210, a module 212, and optionally, an audio amplifier 214 that may be internal or external. The network interface 202 facilitates a data flow between a data network (i.e., the data network 108 of FIG. 1) and the zone player 200 and typically executes a special set of rules (i.e., a protocol) to send data back and forth. One of the common protocols used in the Internet is TCP/IP (Transmission Control Protocol/Internet Protocol). In general, a network interface manages the assembling of an audio source or file into smaller packets that are transmitted over the data network or reassembles received packets into the original source or file. In addition, the network interface 202 handles the address part of each packet so that the packet(s) arrive at the correct destination or intercepts packets destined for the zone player 200.

The network interface 202 may include one or both of a wireless interface 216 and a wired interface 217. The wireless interface 216, also referred to as an RF interface, provides network interface functions by a wireless means for the zone player 200 to communicate with other devices in accordance with a communication protocol (such as the wireless standard IEEE 802.11a, 802.11b or 802.11g). The wired interface 217 provides network interface functions by a wired means (e.g., an Ethernet cable). In one embodiment, a zone player includes both of the interfaces 216 and 217, and other zone players include only a RF or wired interface. Thus these other zone players communicate with other devices on a network or retrieve audio sources via the zone player 200.

The processor 204 is configured to control the operation of other parts in the zone player 200. The memory 206 may be loaded with one or more software modules 212 that can be executed by the processor 204 to achieve desired tasks. In some examples, the processor 204 operates in accordance with the software module 212 to configure, characterize and/or save a zone group created by a user. Also, in some examples, the processor 204 operates in conjunction with the software module 212 to retrieve an audio source or track from another zone player or a device on the network.

In some embodiments, the memory 206 stores one or more saved zone configuration files that may be retrieved for modification at any time. Typically, a saved zone group configuration file is transmitted to a controller (e.g., the controlling device 140 or 142 of FIG. 1, a computer, a portable device, or a TV) when a user operates the controlling device. The zone group configuration provides an interactive user interface so that various manipulations or control of the zone players may be performed.

The audio processing circuit 210 resembles most of the circuitry in an audio playback device and includes one or more digital-to-analog converters (DAC), an audio preprocessing part, an audio enhancement part or a digital signal processor and others. In operation, when an audio source is retrieved via the network interface 202, the audio source is processed in the audio processing circuit 210 to produce analog audio signals. The processed analog audio signals are then provided to the audio amplifier 214 for playback on speakers. In addition, the audio processing circuit 210 may include necessary circuitry to process analog signals as inputs to produce digital signals for sharing with other devices on a network.

Depending on an exact implementation, the module 212 may be implemented as a combination of hardware and software. In one embodiment, the module 212 is used to save a scene. The audio amplifier 214 is typically an analog circuit that powers the provided analog audio signals to drive one or more speakers.

Figure 2B:
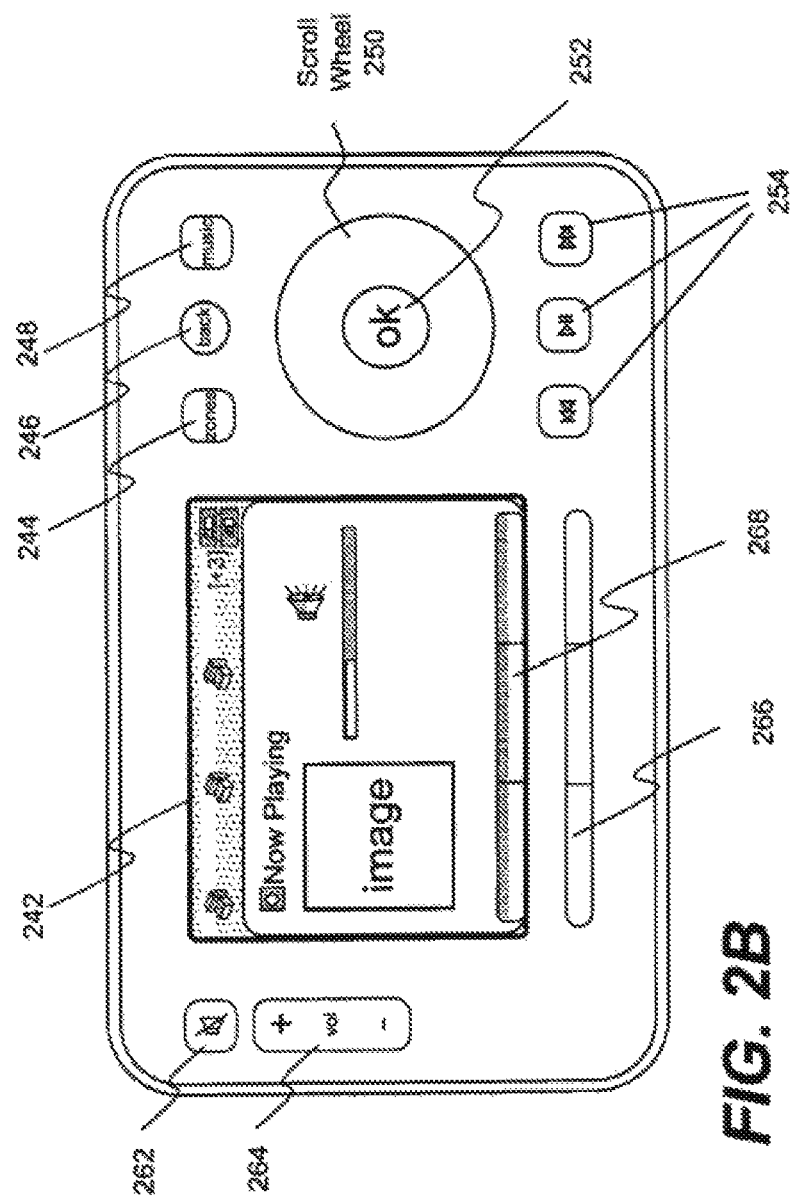
FIG. 2B illustrates an example of a controller that may be used to remotely control one of more players of FIG. 2A.

FIG. 2B illustrates an example controller 240, which may correspond to the controlling device 140 or 142 of FIG. 1. The controller 240 may be used to facilitate the control of multi-media applications, automation and others in a complex. In particular, the controller 240 is configured to facilitate a selection of a plurality of audio sources or tracks available on the network, controlling operations of one or more zone players (e.g., the zone player 200) through a RF interface corresponding to the RF interface 216 of FIG. 2A. According to one embodiment, the wireless means is based on an industry standard (e.g., infrared, radio, wireless standard IEEE 802.11a, 802.11b or 802.11g). When a particular audio source is being played in the zone player 200, a picture associated with the audio source or track may be transmitted from the zone player 200 to the controller 240 for display. In one embodiment, the controller 240 is used to synchronize more than one zone players by grouping the zone players. In another embodiment, the controller 240 is used to control the volume of each of the zone players in a zone group individually or together. The user interface for the controller 240 includes a screen 242 (e.g., a LCD screen) and a set of functional buttons as follows: a "zones" button 244, a "back" button 246, a "music" button 248, a scroll wheel 250, "ok" button 252, a set of transport control buttons 254, a mute button 262, a volume up/down button 264, a set of soft buttons 266 corresponding to the labels 268 displayed on the screen 242. The screen 242 displays various screen menus in response to a user's selection. In one embodiment, the "zones" button 244 activates a zone management screen or "Zone Menu". The "back" button 246 may lead to different actions depending on the current screen. In one embodiment, the "back" button triggers the current screen display to go back to a previous one. In another embodiment, the 'back" button negates the user's erroneous selection. The "music" button 248 activates a music menu, which allows the selection of an audio source (e.g., a song) to be added to a zone player's music queue for playback.

The scroll wheel 250 is used for selecting an item within a list, whenever a list is presented on the screen 242. When the items in the list are too many to be accommodated in one screen display, a scroll indicator such as a scroll bar or a scroll arrow is displayed beside the list. When the scroll indicator is displayed, a user may rotate the scroll wheel 250 to either choose a displayed item or display a hidden item in the list. The "ok" button 252 is used to confirm the user selection on the screen 242.

There are three transport buttons 254, which are used to control the effect of the currently playing song. For example, the functions of the transport buttons may include play/pause and forward/rewind a song, move forward to a next song track, or move backward to a previous track. According to one embodiment, pressing one of the volume control buttons such as the mute button 262 or the volume up/down button 264 activates a volume panel. In addition, there are three soft buttons 266 that can be activated in accordance with the labels 268 on the screen 242. It can be understood that, in a multi-zone system, there may be multiple audio sources being played respectively in more than one zone players. The music transport functions described herein shall apply selectively to one of the sources when a corresponding one of the zone players or zone groups is selected.

Figure 2C:
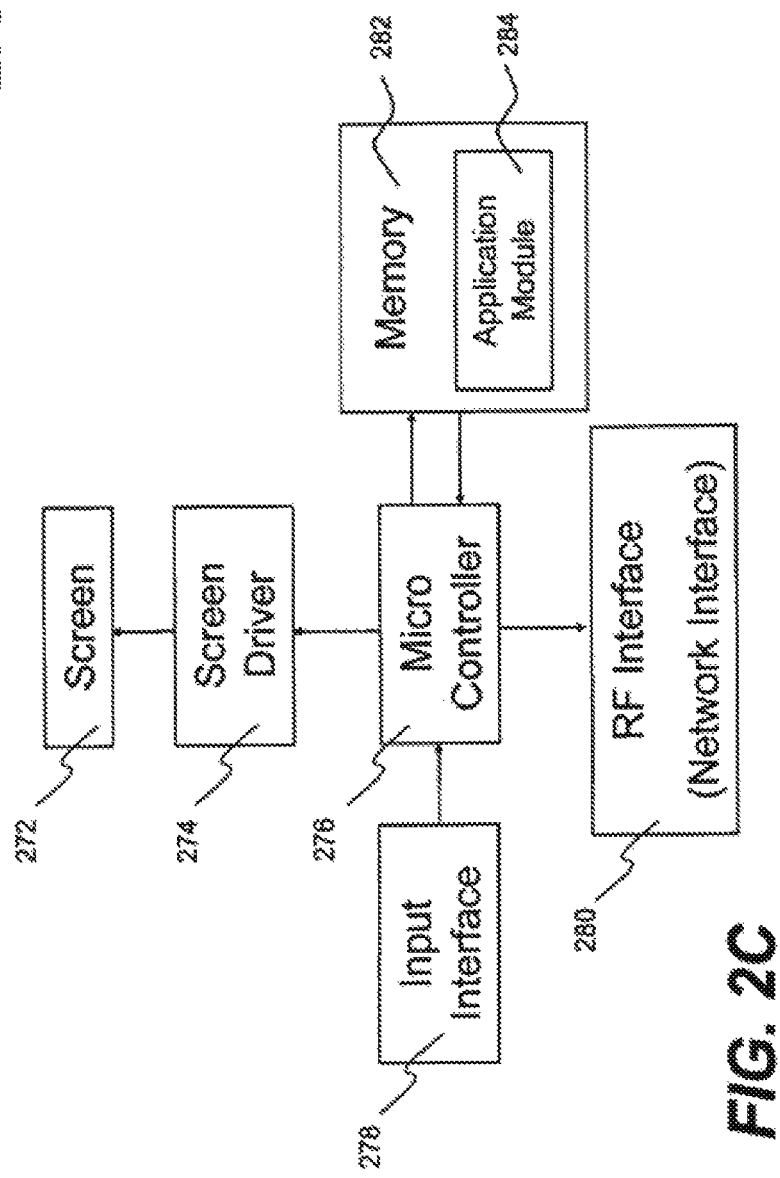
FIG. 2C illustrates an exemplary internal functional block diagram of an example controller.

FIG. 2C illustrates an internal functional block diagram of an exemplary controller 270, which may correspond to the controller 240 of FIG. 2B. The screen 272 on the controller 270 may be a LCD screen. The screen 272 communicates with and is commanded by a screen driver 274 that is controlled by a microcontroller (e.g., a processor) 276. The memory 282 may be loaded with one or more application modules 284 that can be executed by the microcontroller 276 with or without a user input via the user interface 278 to achieve desired tasks. In one embodiment, an application module is configured to facilitate grouping a number of selected zone players into a zone group and synchronizing the zone players for one audio source. In another embodiment, an application module is configured to control together the audio volumes of the zone players in a zone group. In operation, when the microcontroller 276 executes one of the application modules 284, the screen driver 274 generates control signals to drive the screen 272 to display an application specific user interface.

The controller 270 includes a network interface 280 referred to as a RF interface 280 that facilitates wireless communication with a zone player via a corresponding RF interface thereof. In one embodiment, the commands such as volume control and audio playback synchronization are sent via the RF interfaces. In another embodiment, a saved zone group configuration is transmitted between a zone player and a controller via the RF interfaces. The controller 270 may control one or more zone players, such as 102, 104 and 106 of FIG. 1. Nevertheless, there may be more than one controllers, each preferably in a zone (e.g., a room) and configured to control anyone and all of the zone players.

In one embodiment, a user creates a zone group including at least two zone players from the controller 240 that sends signals or data to one of the zone players. As all the zone players are coupled on a network, the received signals in one zone player can cause other zone players in the group to be synchronized so that all the zone players in the group playback an identical audio source or a list of identical audio sources in a timely synchronized manner. Similarly, when a user increases the audio volume of the group from the controller, the signals or data of increasing the audio volume for the group are sent to one of the zone players and causes other zone players in the group to be increased together in volume and in scale.

According to one implementation, an application module is loaded in memory 282 for zone group management. When a predetermined key (e.g. the "zones" button 244) is activated on the controller 240, the application module is executed in the microcontroller 276. The input interface 278 coupled to and controlled by the microcontroller 276 receives inputs from a user. A "Zone Menu" is then displayed on the screen 272. The user may start grouping zone players into a zone group by activating a "Link Zones" or "Add Zone" soft button, or de-grouping a zone group by activating an "Unlink Zones" or "Drop Zone" button. The detail of the zone group manipulation will be further discussed below.

As described above, the input interface 278 includes a number of function buttons as well as a screen graphical user interface. Additionally or alternatively, devices other than the controller 240 that provide the equivalent control functions (e.g., a computing device, a hand-held device) may also be configured to practice the examples disclosed herein. In addition, the controller 240 may provide a social portal through which users can share, among other things, playlists with users of other households. In certain embodiments, any number of controllers may be used to control the system configuration 100. In certain embodiments, there may be a limit on the number of controllers that can control the system configuration 100. The controllers might be wireless like wireless controller 240 or wired to the data network 108. Furthermore, an application running on any network-enabled portable devices, such as an iPhone™, iPad™, Android™ powered phone, or any other smart phone or network-enabled device may be used as a controller by connecting to the data network 108. An application running on a laptop or desktop PC or Mac may also be used as a controller. Example controllers include a "Sonos® Controller 200," "Sonos® Controller for iPhone," "Sonos® Controller for iPad," "Sonos® Controller for Android, "Sonos® Controller for Mac or PC," which are offered by Sonos, Inc. of Santa Barbara, Calif.

One mechanism for 'joining' zone players together for music playback is to link a number of zone players together to form a group. To link a number of zone players together, a user may manually link each zone player or room one after the other. For example, a multi-zone system may include the following zones: Bathroom, Bedroom, Den, Dining Room, Family Room and/or Foyer. The user can dynamically link one or more of the zone players with a single command. Using what is referred to herein as a "theme" or a "zone scene", zones can be configured in a particular scene (e.g., morning, afternoon, or garden), where a predefined zone grouping and setting of attributes for the grouping are automatically effectuated.

For instance, a "Morning" zone scene/configuration command would link the Bedroom, Den and Dining Room together in one action. Without this single command, the user would need to manually and individually link each zone. Other examples are disclosed in U.S. patent application Ser. No. 12/035,112, which is hereby incorporated by reference in its entirety.

In certain embodiments, two or more zone players may be sonically consolidated to form a single, consolidated zone player. A consolidated zone player (though made up of multiple, separate devices) may be configured to process and reproduce sound differently than an unconsolidated zone player or zone players that are paired, because a consolidated zone player will have additional speaker drivers from which sound may be passed. The consolidated zone player may further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-110 are numerous. Music from a personal library stored on a computer or networked-attached storage (NAS) may be accessed via the data network 108 and played. Internet radio stations, shows, and podcasts may be accessed via the data network 108. Music services that let a user stream and download music and audio content may be accessed via the data network 108. Further, music may be obtained from traditional sources, such as a turntable or CD player, via a line-in connection to a zone player, for example. Audio content may also be accessed through AirPlay™ wireless technology by Apple, Inc., for example. Audio content received from one or more sources may be shared amongst the zone players 102-110 via the data network 108 and/or the controller 240.

Regardless of where a user of the system configuration 100 obtains access to his or her audio, the user may share his or her listening experience with a user of a different system configuration, such as a different household. As such, an account holder on a subscription service may share songs with account holders of other subscriptions services. In addition, search capabilities allow songs to be shared across music services or in a local library, by searching for the artist, album, and/or title.

III. Example Audio Track Selection System

Figure 3:
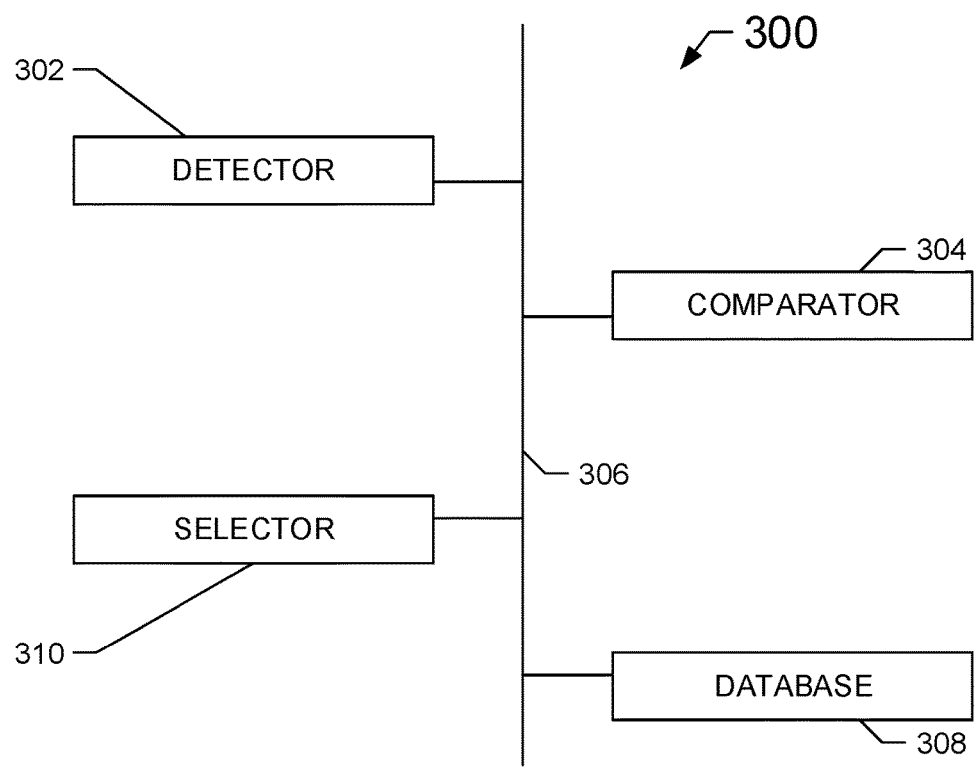
FIG. 3 is a block diagram of an example system to select an audio track.

Referring now to FIG. 3, there is shown an example functional block diagram of an audio source or track selection system 300 in accordance with an embodiment. The audio track selection system 300 may be used, for example, by a user operating any of the zone players 102-110 of FIG. 1.

The example system 300 includes a detector 302. The example detector 302 detects a first playback condition and a second playback condition. In some examples, the detector 302 detects any number of additional conditions such as for example, three, four, etc. As detailed above, a playback condition may be any condition, state, attribute, characteristic and/or other situation or metric related to the playing of an audio track. For example, the condition may be a time related condition, a location related condition a user related condition and/or any other suitable condition.

The detector 302 detects a condition using, for example, an internal clock and/or calendar to determine a time related condition. The detector 302 may include a GPS unit and/or any other type of sensor that may be used to determine a location related condition. In some examples, the playback device is mobile (e.g., a mobile phone), and the device may include a location sensor to determine a location of the device. In addition, the detector 302 may review previously recorded location data including, for example, a room or a zone corresponding to a playback device.

The example system 300 also includes a comparator 304. The comparator 304 is communicatively coupled to the detector 302 and to other components of the example system 300 via communication links 306. The communication links 306 may be any type of wired (e.g., a databus, a USB connection, etc.) or wireless communication mechanism (e.g., radio frequency, infrared, etc.) using any past, present or future communication protocol (e.g., Bluetooth, USB 2.0, etc.). Also, the components of the example system 400 may be integrated in one device or distributed over two or more devices.

The example comparator 304 compares an audio track property of an audio track to a first playback condition and the second playback condition. The audio track may be stored for example, in a database 308. The database 308 may be, for example, any storage structure including, for example, a local storage memory such as, for example in any of the zone players 102-110 of FIG. 1 and/or the zone player 200 of FIG. 2A. Also, in some examples, the database 308 may be a network-based database such as, for example, a database accessible via the internet and/or a cloud.

The example audio track(s) are associated with related properties. The properties may include for example, the artist, genre, rhythm, tempo, past play history, popularity with each of a number of users, popularity with a demographic group, rating on a ranking chart (e.g., Billboard Top 40, Top 100, etc.), a characteristic to match a condition and/or any other suitable characteristic or metric.

In certain embodiments, track(s) are be tagged with metadata related to the properties. The metadata may be provided by the distributor of the track including, for example, metadata related to the artist, album, genre, etc. In addition, metadata may be added by a user including, for example, an indication that the user likes a certain song, that the user likes a certain song at a certain time of day, likes a certain song while driving, likes to awake to a certain song, that a certain song reminds the user of a certain person or event. Users can tagged a track with metadata related to any type of condition and such metadata becomes part of the property of the track. In certain embodiments, the metadata is tagged to a song automatically. For example, the detector 302 may detect that a specific track is played frequently in the morning and, in such example, the track may be tagged automatically as a morning song. In some examples, the detector 302 detects that a particular user listens to a particular track, and the track may be tagged automatically as related to that user. In some embodiments the metadata may also include information such as, for example, a recentness of a playback of a track and/or a frequency of playback. In addition, the recentness and/or frequency metadata may include a weighting metric to weigh the associated track. For example, a more frequently played track may be more heavily weighed as an indication that the track and/or similar tracks should be selected for playback as described below. Particular artists, albums, genres and other properties may also be weighed. All metadata and other properties may be stored with the tracks in the database 308. In some examples, the audio property is tied to the condition and not necessarily tagged or otherwise tied with the song. For example, a track may be desired to be played at a certain time of day, and the audio track may not necessarily be tagged with the specific time of day. However, if the time of day during the operation of the playback device and/or the selection of the track is, in fact, the time of day specified in the condition, the "audio property" will be deemed to have met the condition.

Based on the comparison of the first audio track property and the first and second playback conditions, the example comparator 304 determines if the first audio track property matches one or more of the first playback condition or the second playback condition. In addition, the example comparator compares a second audio track property of the first audio track to the first playback condition and the second playback condition, and determines if the second audio track property matches one or more of the first playback condition or the second playback condition.

The example system 300 also includes a selector 310. The selector 310 selects an audio track for presentation to the user when the first playback condition matches one or more of the first audio track property or the second audio track property and the second playback condition matches one or more of the first audio track property or the second audio track property.

For example, a particular user's listening habits indicate that he typically listens to bossa nova and jazz in the morning. In this example, a first condition would be the morning time, and the second condition would be the genre bossa nova/jazz. When the user turns on a playback device to listen to music, the example system 300 uses the detector 302 to determine that it is the morning and that the user likes to hear bossa nova/jazz. The comparator 304 compares audio tracks in the database 308 and the associated properties. When a track is analyzed that has properties that indicate that the genre is bossa nova/jazz and the song is suitable or desirable for play in the morning, the selector 310 may choose the track and/or related track(s) (e.g., a playlist) for presentation to the user. For example, the recording artist Thievery Corporation may have properties that include tags from the record label that indicate that the genre of music is bossa nova/jazz and metadata entered by the user or other users, for example, that indicate that they like to hear Thievery Corporation music in the morning. Additionally or alternatively, the system 300 may detect that the user frequently listens to Thievery Corporation in the morning and tags Thievery Corporation tracks as suitable and/or desirable for morning play. In other examples, if the Thievery Corporation track is not specifically tagged as morning-suitable, the track may nonetheless meet the conditions if the time of day is the morning. Thus, the "audio properties" may extend beyond what is actually tagged to a particular track, as noted above.

Also, in this example, if only one of the two conditions is met, for example, if an audio track is tagged as appropriate for the morning, but the genre is country, the comparator 304 would indicate that the track does not match or meet the conditions, and the track would not be selected for presentation to the user.

In some examples, the system 300 may analyze several tracks such that the comparator 304 compares a third audio track property of a second audio track to the first playback condition and the second playback condition to determine if the third audio track property matches one or more of the first playback condition or the second playback condition, and compares a fourth audio track property of the second audio track to the first playback condition and the second playback condition to determine if the fourth audio track property matches one or more of the first playback condition or the second playback condition. In such examples, the selector 310 selects the second audio track for presentation to the user when the first playback condition matches one or more of the third audio track property or the fourth audio track property and the second playback condition matches one or more of the third audio track property or the fourth audio track property.

In some examples, the condition and the related property are related to the user of the playback device. For example, the condition and/or property may be the user's identity, a demographic group and/or an interest of the user. In some embodiments, the detector 302 may detect who the user is based on the registration of the playback device. For example, who registered an iPhone, iPad or other controller that is controlling the zone group, zone room, zone player, etc. The detector 302 may also detect other users controlling other players in other rooms. In such examples, the detector 302 may review count or profile information associated with the device. In other examples, the user may establish an account or profile to operate the device such as, for example, a Sonos® profile or a profile with a free or subscription-based music and/or radio services including, for example, Pandora®, Spotify™, Rhapsody™, MOG, Napster™ and/or any other existing or future music service.

In some embodiments, the system 300 asks the user for his or her identity or for the identity of the person for whom the music for. In some examples, the system 300 can determine who the user is based on an operational history of the playback device. For example, if a user selects a specific genre, skips certain songs, repeats other songs, etc., the system 300 can deduce who is operating the playback device.

In certain embodiments, the example system 300 data mines for further information about the user to better characterize the user and his or her preferences. For example, the system 300 may look to what friends and/or associates of the user are listening to. The friends and/or associates of the user may be people that use the same playback device as the user, people the user has indicated music is intended to be played for, people connected to the user in a social network such as, for example, Facebook, Google+, Myspace, Yelp, LinkedIn, Friendster, Flickr, Twitter, Spotify, Bebo, Renren, Weibo, any other online network and/or any non-internet-based network (e.g., friends, relatives, neighbors, etc.) and/or people who belong to the same demographic groups as the user.

Data may also be gathered about a user or a group of users by analyzing how a user's music selection has changed over time and/or over different locations (e.g., the Beatles were playing in the living last year and this year Bocelli is playing). The system 300 may determine trends such as, for example, trends identifiable on a social network site (e.g., Facebook), a search engine (e.g., Google) and/or a file sharing service (e.g., YouTube). The system 300 may gather and/or analyze data regarding what a user or a group of users liked or disliked on social networks and/or music services. In other examples, the user may be queried for additional demographic and/or personal information including age (e.g., a younger person may like pop music and an older person may like classic country music), where the user was raised, when the user was raised, where the user is currently living (e.g., country music is more popular in certain regions such as the Southern U.S. or rural areas as opposed to the urban coasts of the U.S.), or geographic or regional affinities the user may have (e.g., a user may be a Francophile and, thus, interested in French electronica), memories of world event during childhood and/or adulthood (e.g., users who grew up in the 1940s may have different tastes in music than people who grew up in the 1960s due to cultural and historical events of the time), what music the user likes, what instruments the user likes, and/or any other information including, for example, information seemingly unrelated to music. For example, the user may be asked if he or she would participate in a fox hunt, the response to which may be used to indicate if the user would be interested in listening to classical music.

In some examples, the user may tag a portion of music that is playing such as, for example, a lyric, a chorus, a riff, etc. The tagged portion may be shared with friends and/or associates via, for example, a link (and via, for example, the controller 240). The tagged portions of tracks may be used to gather further information about a user's taste.

When the selector 310 selects one or more audio track(s) for presentation to the user, the system 300 automatically play the track for the user or may automatically put the track into a playlist or queue for playback. The playlist may be updated over time, including, for example removing unplayed track(s). In addition, in some examples, the track(s) may be presented under a tab visible on a display of the playback device (e.g., the display 242 of FIG. 2B). In certain embodiments, the system 300 presents the user with a link to obtain the audio track (e.g., an unpurchased track).

In some examples, the playback device may have a smart play button (e.g., another purpose for the music button 248 of FIG. 2B) on the controller itself that could activate the system 300 and, thus, generate a track selection and/or a smart playlist for that room, zone, zones, etc. and/or for a particular time.

In some examples disclosed herein, the playback of a track may be included with an alarm. For example, a user who likes surfing may set conditions for a playback device to being playing surf music such as surf rock in the morning (i.e., as an alarm) based on further conditions such as, for example, if an outdoor temperature and/or a water temperature of the ocean exceed a threshold (e.g., 65° F.) and a surf report indicates swells greater than a threshold (e.g., three feet). In this example, there are four conditions, time, genre, weather, and ocean conditions. The first two conditions (time and genre) may be used to select the music for playing as the alarm. The last two conditions (weather and ocean conditions) are not related to the music selection itself, in this example. In other examples, weather and/or ocean conditions may be defined by the user as conditions for song selection. In addition, in this example, the first, third and fourth conditions (time, weather and ocean conditions) are used to determine if the alarm will sound at all. In addition, in certain embodiments, there may be a portal associated with the controller to enable the user to create conditions related to music selection and/or music play.

In another example, an alarm may have conditions tied to a plurality of users. For example, an alarm may sound but require two or more people to shut it off (e.g., a group of Boy Scouts waking up together for a camping trip or a group of employees or peers invited to the same morning meeting).

While example manners of implementing the example systems 100 and 300 to play, match and/or select audio track(s) have been illustrated in FIGS. 1, 2A-C and 3, one or more of the elements, processes and/or devices illustrated in FIGS. 1, 2A-C and 3 may be combined, divided, re-arranged, omitted, eliminated and/or implemented in any other way. Further, the example zone players 102, 104, 106, 110 and 200, the audio source 112, the example controlling device 140 and 142, the example network interface 202, the example wireless interface 216, the example wired interface 217, the example processor 204, the example memory 206, the example audio processing circuit 210, the example module 212, the example audio amplifier, the example screen 242 and 272, the other components of the example interface of FIG. 2B, the example screen driver 274, the example micro controller 276, the example input interface 278, the example memory 282, the example application module 284, the example RF interface 280, the example detector 302, the example comparator 304, the example database 308 and/or the example selector 310 and/or, more generally, the example systems 100 of FIG. 1 and 300 of FIG. 3 may be implemented by hardware, software, firmware and/or any combination of hardware, software and/or firmware. Thus, for example, the example zone players 102, 104, 106, 110 and 200, the audio source 112, the example controlling device 140 and 142, the example network interface 202, the example wireless interface 216, the example wired interface 217, the example processor 204, the example memory 206, the example audio processing circuit 210, the example module 212, the example audio amplifier, the example screen 242 and 272, the other components of the example interface of FIG. 2B, the example screen driver 274, the example micro controller 276, the example input interface 278, the example memory 282, the example application module 284, the example RF interface 280, the example detector 302, the example comparator 304, the example database 308 and/or the example selector 310 and/or, more generally, the example systems 100 of FIG. 1 and 300 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example zone players 102, 104, 106, 110 and 200, the audio source 112, the example controlling device 140 and 142, the example network interface 202, the example wireless interface 216, the example wired interface 217, the example processor 204, the example memory 206, the example audio processing circuit 210, the example module 212, the example audio amplifier, the example screen 242 and 272, the other components of the example interface of FIG. 2B, the example screen driver 274, the example micro controller 276, the example input interface 278, the example memory 282, the example application module 284, the example RF interface 280, the example detector 302, the example comparator 304, the example database 308 and/or the example selector 310 are hereby expressly defined to include hardware and/or a tangible computer readable medium such as a memory, DVD, CD, etc. storing the software and/or firmware. Further still, the example systems 100 of FIG. 1 and 300 of FIG. 3 may include one or more elements, processes and/or devices in addition to, or instead of, those illustrated in FIGS. 1 and 3, and/or may include more than one of any or all of the illustrated elements, processes and devices.

Figure 4:
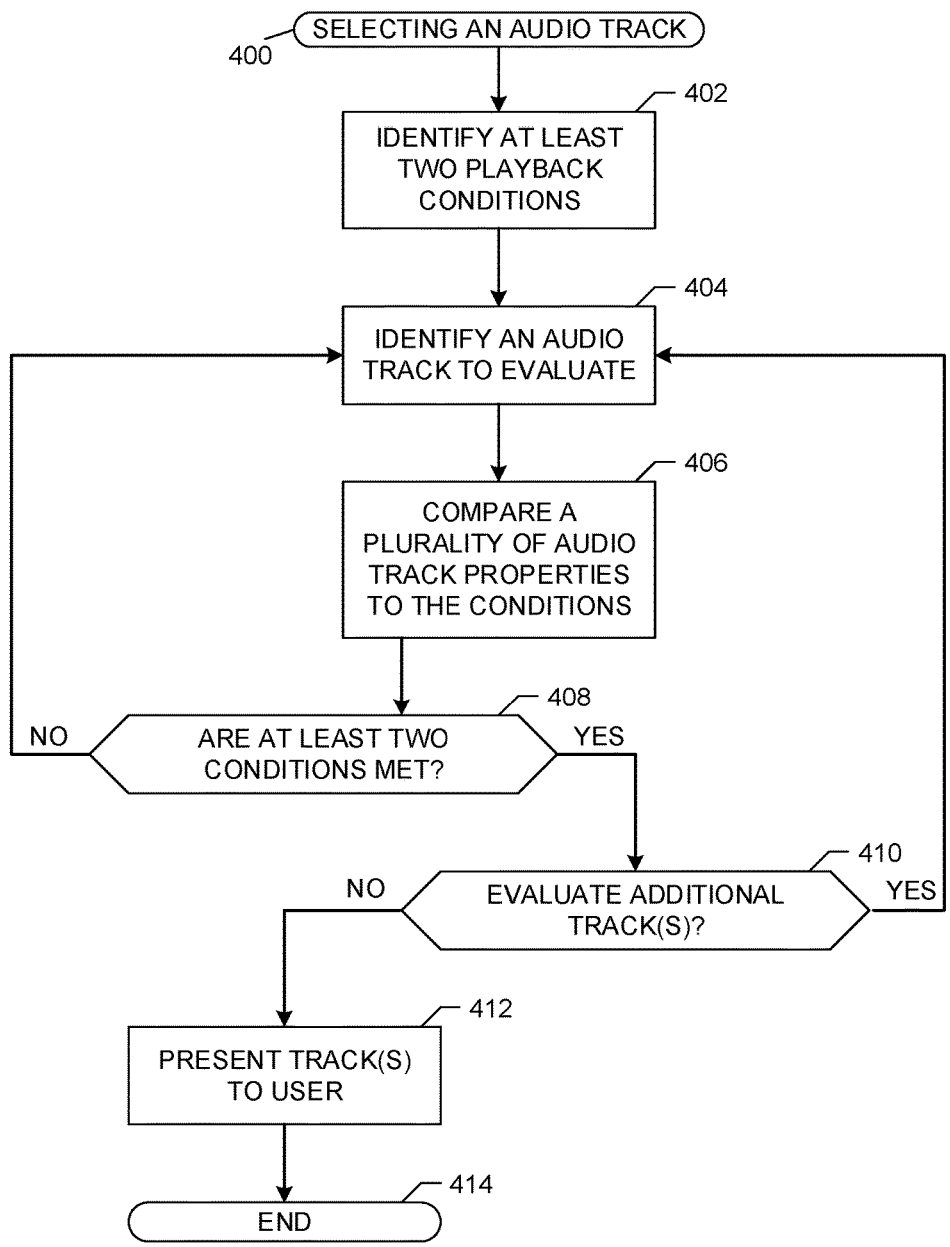
FIG. 4 is flowchart representative of an example method and example machine readable instructions that can be executed to implement the example system of FIG. 4.

FIG. 4 is a flowchart representative of example machine readable instructions that may be executed to implement the example systems 100 and 300, the example zone players 102, 104, 106, 110 and 200, the audio source 112, the example controlling device 140 and 142, the example network interface 202, the example wireless interface 216, the example wired interface 217, the example processor 204, the example memory 206, the example audio processing circuit 210, the example module 212, the example audio amplifier, the example screen 242 and 272, the other components of the example interface of FIG. 2B, the example screen driver 274, the example micro controller 276, the example input interface 278, the example memory 282, the example application module 284, the example RF interface 280, the example detector 302, the example comparator 304, the example database 308 and/or the example selector 310 and/or other components of FIGS. 1, 2A-C and 3. In the example of FIG. 4, the machine readable instructions include a program for execution by a processor such as the processor 512 shown in the example computer 500 discussed below in connection with FIG. 5. The program may be embodied in software stored on a tangible computer readable medium such as a CD-ROM, a floppy disk, a hard drive, a digital versatile disk (DVD), or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example systems 100 and 300, the example zone players 102, 104, 106, 110 and 200, the audio source 112, the example controlling device 140 and 142, the example network interface 202, the example wireless interface 216, the example wired interface 217, the example processor 204, the example memory 206, the example audio processing circuit 210, the example module 212, the example audio amplifier, the example screen 242 and 272, the other components of the example interface of FIG. 2B, the example screen driver 274, the example micro controller 276, the example input interface 278, the example memory 282, the example application module 284, the example RF interface 280, the example detector 302, the example comparator 304, the example database 308 and/or the example selector 310 and/or the other components of FIGS. 1, 2A-C and 3 may alternatively be used. For example, the order of execution of the blocks may be changed, and/or some of the blocks described may be changed, eliminated, or combined.

As mentioned above, the example processes of FIG. 4 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 4 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 4 illustrates an example method of selecting an audio track (block 400). In the example process 400, at least two playback conditions (e.g., characteristics or attributes related to the desired playback of an audio track) are identified (block 402), using, for example, the example detector 302 of FIG. 3. The example process 400 also identifies an audio track to evaluate (block 404), using for example, the detector 302 or comparator 304 of FIG. 3. The audio track is evaluated to compare a plurality of the audio track properties (e.g., artist, genre, user- or distributor-initiated tagged metadata) to the identified conditions (block 406).

The example process 400 determines if at least two conditions are met by the audio track properties (block 408). For example, if the conditions are (1) playing a specific genre at (2) a specific time of day, the process 400 reviews the properties of an audio track to determine if the audio track matches the genre and if the audio track has been tagged as music for a particular time of day and/or if the time of day is, in fact, the selected time of day. If the audio properties do not match at least two conditions (block 408), the example process 400 returns to identify another audio track to evaluate (block 404). If the audio properties do match at least two conditions (block 408), the example process 400 determines if additional track(s) are to be evaluated (block 410). If additional track(s) are to be evaluated (block 410), the example process 400 returns to identify another audio track to evaluate (block 404). If additional track(s) are not to be evaluated (block 410), the example process 400 presents the track(s) to the user (block 412) using, for example the displays and presentation described above. The process 400 then ends (block 414).

Figure 5:
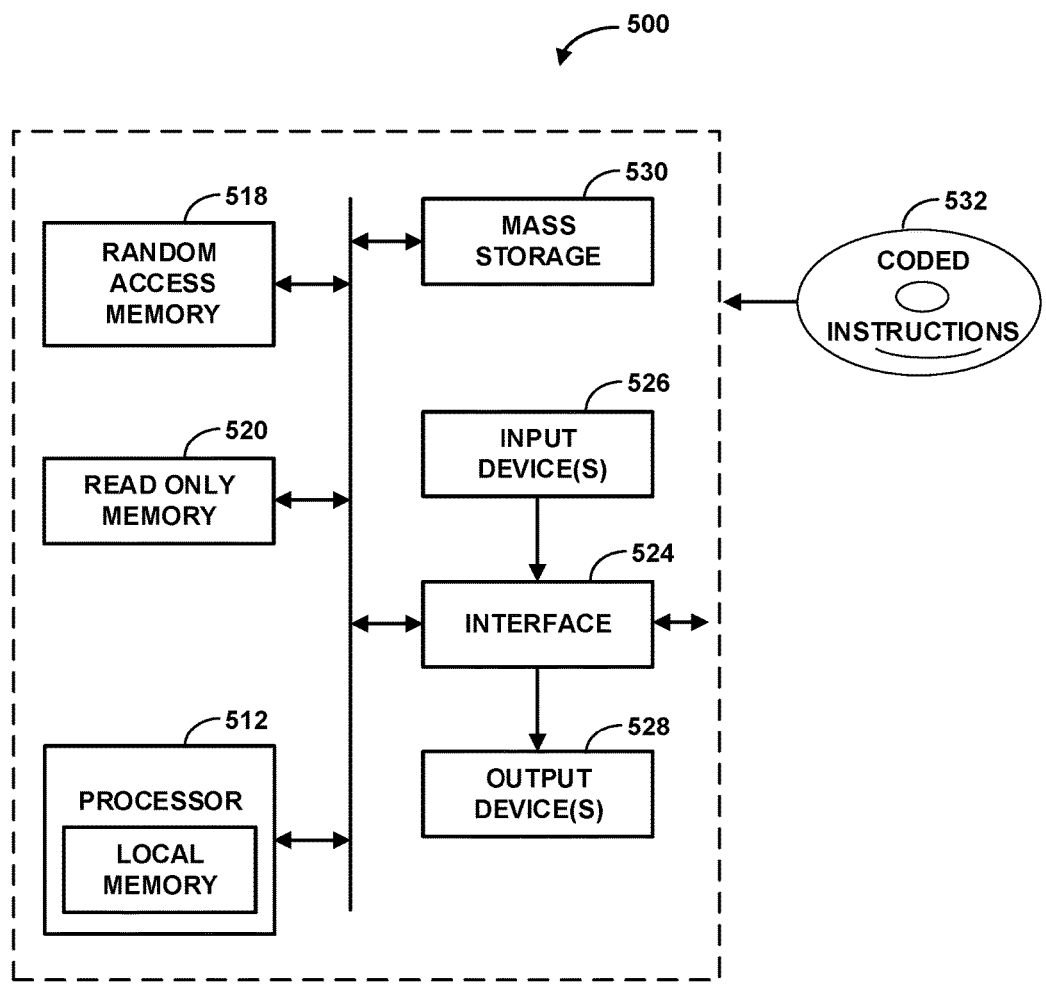
FIG. 5 is an example processor platform capable of implementing the example systems of FIGS. 1 and 3 and/or the methods and instructions of FIG. 4.

FIG. 5 is a block diagram of an example computer 500 capable of executing the instructions of FIG. 4 to implement the example systems 100 and 300, the example zone players 102, 104, 106, 110 and 200, the audio source 112, the example controlling device 140 and 142, the example network interface 202, the example wireless interface 216, the example wired interface 217, the example processor 204, the example memory 206, the example audio processing circuit 210, the example module 212, the example audio amplifier, the example screen 242 and 272, the other components of the example interface of FIG. 2B, the example screen driver 274, the example micro controller 276, the example input interface 278, the example memory 282, the example application module 284, the example RF interface 280, the example detector 302, the example comparator 304, the example database 308 and/or the example selector 310 and/or the other components of FIGS. 1, 2A-C and 3. The computer 500 can be, for example, a server, a personal computer, a mobile phone (e.g., a cell phone), a personal digital assistant (PDA), an Internet appliance, a set top box, or any other type of computing device.

The computer 500 of the instant example includes a processor 512. For example, the processor 512 can be implemented by one or more Intel® microprocessors from the Pentium® family, the Itanium® family or the XScale® family. Of course, other processors from other families are also appropriate.

The processor 512 is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is typically controlled by a memory controller (not shown).

The computer 500 also includes an interface circuit 520. The interface circuit 520 may be implemented by any type of interface standard, such as an Ethernet interface, a universal serial bus (USB), and/or a PCI express interface.

One or more input devices 522 are connected to the interface circuit 520. The input device(s) 522 permit a user to enter data and commands into the processor 512. The input device(s) can be implemented by, for example, a keyboard, a mouse, a touchscreen, a track-pad, a trackball, isopoint and/or a voice recognition system.

One or more output devices 524 are also connected to the interface circuit 520. The output devices 524 can be implemented, for example, by display devices (e.g., a liquid crystal display, a cathode ray tube display (CRT), a printer and/or speakers). The interface circuit 520, thus, typically includes a graphics driver card.

The interface circuit 520 also includes a communication device (e.g., the request servicer) such as a modem or network interface card to facilitate exchange of data with external computers via a network 526 (e.g., an Ethernet connection, a digital subscriber line (DSL), a telephone line, coaxial cable, a cellular telephone system, etc.).

The computer 500 also includes one or more mass storage devices 528 for storing software and data. Examples of such mass storage devices 528 include floppy disk drives, hard drive disks, compact disk drives, and digital versatile disk (DVD) drives. The mass storage device 528 may implement the storage database 308.

The coded instructions of FIG. 5 may be stored in the mass storage device 528, in the volatile memory 514, in the non-volatile memory 516, and/or on a removable storage medium such as a CD or DVD.

Various inventions have been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the present disclosure as claimed. While the embodiments discussed herein may appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

We claim:

1. A network device comprising:
   at least one processor;
   data storage; and
   a program logic stored in the data storage and executable by the at least one processor to perform functions comprising:
      determining a first playback condition comprising an identification of at least one first user and a second playback condition comprising an identification of at least one second user;
      selecting at least one audio track based on (a) the first playback condition comprising the determined identification of the at least one first user, (b) the second playback condition comprising the determined identification of the at least one second user, and (c) a third playback condition comprising a time of day; and
      causing a playback device to begin playback of the selected at least one audio track.

2. The network device of claim 1, wherein the network device is the playback device.

3. The network device of claim 1, wherein causing the playback device to begin playback of the selected at least one audio track comprises causing a group of playback devices comprising the playback device to begin playback of the selected at least one audio track.

4. The network device of claim 1, wherein selecting at least one audio track based on the determined identification of the at least one first user comprises selecting at least one audio track based on listening habits of the at least one first user.

5. The network device of claim 1, the functions further comprising:
   before selecting at least one audio track, detecting an instruction to begin playback of audio.

6. The network device of claim 5, wherein detecting the instruction to begin playback of audio comprises receiving the instruction to begin playback of audio, wherein the instruction is associated with the first user.

7. The network device of claim 6, wherein selecting at least one audio track based on the determined identification of the at least one first user comprises selecting at least one audio track based on listening habits of the at least one first user.

8. The network device of claim 7, wherein selecting at least one audio track based on the determined identification of the at least one second user comprises selecting at least one audio track based on listening habits of the at least one second user.

9. The network device of claim 8, wherein the at least one second user comprises at least two second users.

10. The network device of claim 6, wherein the time of day is a time of day that the instruction was received.

11. A method comprising:
    determining a first playback condition comprising an identification of at least one first user and a second playback condition comprising an identification of at least one second user;
    selecting at least one audio track based on the first playback condition comprising (a) the determined identification of the at least one first user, (b) the second playback condition comprising the determined identification of the at least one second user, and (c) a third playback condition comprising a time of day; and
    causing a playback device to begin playback of the selected at least one audio track.

12. The method of claim 11, wherein selecting at least one audio track based on the determined identification of the at least one first user comprises selecting at least one audio track based on listening habits of the at least one first user.

13. The method of claim 11, further comprising:
    detecting an instruction to begin playback of audio before selecting at least one audio track.

14. The method of claim 13, wherein detecting the instruction to begin playback of audio comprises receiving the instruction to begin playback of audio, wherein the instruction is associated with the first user.

15. The method of claim 14, wherein selecting at least one audio track based on the determined identification of the at least one first user comprises selecting at least one audio track based on listening habits of the at least one first user.

16. A tangible, non-transitory computer-readable memory having stored thereon instructions that, when executed by one or more processors of a computing device, cause the computing device to perform functions comprising:
    determining a first playback condition comprising an identification of at least one first user and a second playback condition comprising an identification of at least one second user;
    selecting at least one audio track based on (a) the first playback condition comprising the determined identification of the at least one first user, (b) the second playback condition comprising the determined identification of the at least one second user, and (c) a third playback condition comprising a time of day; and
    causing a playback device to begin playback of the selected at least one audio track.

17. The tangible, non-transitory computer-readable memory of claim 16, wherein the instructions for selecting at least one audio track based on the determined identification of the at least one first user comprise instructions for selecting at least one audio track based on listening habits of the at least one first user.

18. The tangible, non-transitory computer-readable memory of claim 16, further comprising instructions for detecting an indication to begin playback of audio before selecting at least one audio track.

19. The tangible, non-transitory computer-readable memory of claim 18, wherein the instructions for detecting the indication to begin playback of audio comprises comprise instructions for receiving a message to begin playback of audio, wherein the message is associated with the first user.

20. The tangible, non-transitory computer-readable memory of claim 19, wherein the instructions for selecting at least one audio track based on the determined identification of the at least one first user comprise instructions for selecting at least one audio track based on listening habits of the at least one first user.

* * * * *